US 11,358,668 B2

United States Patent
Maffe

(10) Patent No.: US 11,358,668 B2
(45) Date of Patent: Jun. 14, 2022

(54) DIVISIBLE LEGS APRON FOR A MOTOR VEHICLE

(71) Applicant: PIAGGIO & C. SPA, Pontedera (IT)

(72) Inventor: Francesco Maffe, Pontedera (IT)

(73) Assignee: PIAGGIO & C. S.P.A., Pontedera (IT)

( * ) Notice: Subject to any disclaimer, the term of this patent is extended or adjusted under 35 U.S.C. 154(b) by 0 days.

(21) Appl. No.: 16/979,276

(22) PCT Filed: Mar. 12, 2019

(86) PCT No.: PCT/IB2019/051982
§ 371 (c)(1),
(2) Date: Sep. 9, 2020

(87) PCT Pub. No.: WO2019/175760
PCT Pub. Date: Sep. 19, 2019

(65) Prior Publication Data
US 2021/0053641 A1    Feb. 25, 2021

(30) Foreign Application Priority Data

Mar. 15, 2018 (IT) ......................... 102018000003600

(51) Int. Cl.
*B62J 17/06* (2006.01)
(52) U.S. Cl.
CPC .................................. *B62J 17/065* (2013.01)
(58) Field of Classification Search
CPC ...... B62J 17/065; A41D 31/02; A41D 31/102; A41D 2300/50; A41D 2300/52; A41D 2600/102; A41D 2600/104

(Continued)

(56) References Cited

U.S. PATENT DOCUMENTS 1,270,704 A * 6/1918 Creery ...................... A41D 3/08
2/88
3,998,304 A * 12/1976 Edgerton, Jr. ........... A45C 3/00
190/107

(Continued)

FOREIGN PATENT DOCUMENTS

AT        408713 B   *  2/2002    ............. A44B 19/32
DE    10009241 A1  *  8/2001    ............ B62J 17/065

(Continued)

OTHER PUBLICATIONS

International Search Report for corresponding application PCT/IB2019/051982 filed Mar. 12, 2019; dated Jun. 24, 2019.

(Continued)

*Primary Examiner* — D Glenn Dayoan
*Assistant Examiner* — Kevin P Weldon
(74) *Attorney, Agent, or Firm* — Cantor Colburn LLP

(57) ABSTRACT

A legs apron for a motor vehicle includes a first part of apron having anchoring elements for removably anchoring the first part of apron to the motor vehicle, a second part of apron configured to at least cover the legs of a driver of the motor vehicle, a coupling system operatively interposed between the first and the second part of apron for removably coupling the first and second part of apron to each other, the coupling system defining a junction line between the first and second part of apron when the first and second part of apron are coupled together, where the apron further includes a waterproofing element arranged to waterproof the junction line.

13 Claims, 4 Drawing Sheets

(58) Field of Classification Search
USPC ................................................. 296/81, 82
See application file for complete search history.

(56) References Cited

U.S. PATENT DOCUMENTS

| | | | | |
|---|---|---|---|---|
| 4,272,851 | A * | 6/1981 | Goldstein | A41D 27/24 2/275 |
| 4,506,391 | A * | 3/1985 | Rodman | A41D 1/086 2/227 |
| 5,662,372 | A * | 9/1997 | Lubkeman | A41D 3/08 296/136.04 |
| 5,845,336 | A | 12/1998 | Golde | |
| 6,223,349 | B1 * | 5/2001 | Roiser | A44B 19/32 2/2.15 |
| 6,676,188 | B1 * | 1/2004 | McKinney | B60J 7/1295 2/84 |
| 7,191,497 | B2 * | 3/2007 | Butz | A44B 19/32 24/389 |
| 8,336,116 | B2 * | 12/2012 | Seguin | A41D 3/04 2/67 |
| 2010/0269245 | A1 * | 10/2010 | Stubiger | B29C 66/112 2/275 |
| 2014/0041773 | A1 * | 2/2014 | Roberts | B62J 19/00 150/167 |
| 2017/0208907 | A1 * | 7/2017 | Chung | A44B 19/32 |

FOREIGN PATENT DOCUMENTS

| | | |
|---|---|---|
| DE | 102016008878 A1 | 2/2018 |
| EP | 2998207 A1 | 3/2016 |
| FR | 2826627 A3 | 1/2003 |
| WO | WO-2007038814 A2 * | 4/2007 ............. A41D 13/00 |

OTHER PUBLICATIONS

Written Opinion for corresponding application PCT/IB2019/051982 filed Mar. 12, 2019; dated Jun. 24, 2019.

* cited by examiner

DIVISIBLE LEGS APRON FOR A MOTOR VEHICLE

TECHNOLOGICAL FIELD

The present invention in general relates to the field of accessories for motor vehicles, and more specifically it relates to a legs apron for a motor vehicle.

BACKGROUND ART

In the field of motor vehicles, such as motor scooters by way of non-limiting example, it is known to use legs aprons serving the function of protecting the legs of the driver against bad weather, especially during the winter. In particular, legs aprons of the divisible type are known, i.e. legs aprons which comprise a first and second part of apron which may be removably coupled together. Examples of divisible legs aprons are described in Patent Application EP2998207 to Bagster and in Patent Application FR2826627 to Motopolis.

A drawback of the above-mentioned divisible legs aprons of the known art is associated with the fact that a water leak may occur in such aprons along the junction line between the two parts of the apron, particularly when the motor vehicle is moving and the water is pushed according to a direction which substantially is parallel to the plane of the apron. Moreover, leaks may occur in such aprons along the junction line between the two parts of the apron when the legs apron collects water during the stops of the motor vehicle (for example, when the motor vehicle is stopped at the traffic light or parked outdoors, etc.).

SUMMARY

It is an object of the present description to make available a legs apron for a motor vehicle which allows the above-mentioned drawbacks with reference to the known art to be resolved or at least partly obviated.

These and other objects are achieved by means of a legs apron for a motor vehicle as defined in claim 1 in the most general embodiment thereof, and in the claims dependent thereon in certain particular embodiments thereof.

In particular, the aforesaid object is achieved by means of a legs apron for a motor vehicle, comprising:
- a first part of apron comprising anchoring elements for removably anchoring the first part of apron to the motor vehicle;
- a second part of apron configured to at least cover the legs of a driver of the motor vehicle;
- a coupling system operatively interposed between the first and the second part of apron for removably coupling the first and second part of apron to each other, said coupling system defining a junction line between the first and second part of apron when the first and second part of apron are coupled together.

Said apron comprising at least one waterproofing element arranged to waterproof said junction line.

The leaking of water may indeed be reduced or avoided along the junction line between the two parts of the legs apron due to the fact of making waterproof the junction line between the first and second part of apron.

In particular, said at least one waterproofing element may comprise a first longitudinal flap which extends from one of the first and second part of apron and which is adapted to overlap the junction line.

In other words, the first longitudinal flap may extend from the first part of apron towards the second part of apron, or vice versa it may extend from the second part of apron towards the first part of apron. In the first version, the first longitudinal flap is fastened to the first part of apron. The legs apron comprises at least one fastening element arranged for stably and removably fastening, when said first flap overlaps the junction line, said first flap to the other part of apron selected from the first and second part of apron from which the first longitudinal flap does not extend. In other words, if said first flap is fastened to the first part of apron, said first flap surmounts the junction line and is removably fastened at the second part of apron by means of the fastening element. If, contrarily, said first flap is fastened to the second part of apron, said first flap surmounts the junction line and is removably fastened at the first part of apron by means of the fastening element.

Moreover, said at least one waterproofing element may comprise a second longitudinal flap which extends from the aforesaid other part of apron. According to one embodiment in particular, a first longitudinal flap is provided connected to the second part of apron and a second longitudinal flap connected to the first part of apron. In particular, said second flap is configured so as to overlap the junction line and at least partly the first longitudinal flap.

According to one embodiment, said first and second flaps each comprise a first face adapted to face the junction line and an opposite second face. In particular, the second flap is configured so as to overlap the first longitudinal flap so that at least a portion of the first face of the second longitudinal flap may overlap at least a portion of the first face of the first longitudinal flap.

The overlapping between the first and the second flap occurs in the area of the second part of apron. The first flap in particular is positioned so as to surmount the junction line, thus being positioned in the area of the second part of apron. At this point, the contact occurs between the first flap and the second flap, which overlap so as to close and isolate the junction line. According to one embodiment, said first and second flaps may be folded together, in particular according to a longitudinal line parallel to the junction line, so as to achieve a labyrinth seal therebetween once the second longitudinal flap overlaps the first longitudinal flap.

Thereby, a particularly effective seal may be obtained which with respect to the solutions of the known art, allows the leaking of water to be avoided or significantly limited along the junction line between the two parts of the apron, both when the vehicle is moving and the water is pushed according to a direction substantially parallel to the plane of the apron, and when the apron collects water during the stops of the motor vehicle.

According to an advantageous embodiment, said at least one waterproofing element comprises a longitudinal extension which protrudes from said first face of the first longitudinal flap and which is joined to the first face of the first longitudinal flap so as to define a fold line.

In other words, the longitudinal extension in turn is a portion of flap, or a duplication, of the first flap, which partly is connected to the first face of the first flap in a connection portion and extends overhangingly therefrom, thus forming a fold line. The latter substantially is obtained downstream of the connection portion. In particular, said second flap is adapted to at least partly overlap said longitudinal extension so as to be folded together with the longitudinal extension about the fold line.

Conveniently, the fact of providing the aforesaid longitudinal extension which protrudes from the first face of the first longitudinal flap allows the overlapping of the first and the second longitudinal flap to be facilitated and accordingly, the labyrinth seal to be made in a particularly easy manner.

The longitudinal extension may comprise at least one stiffening element, or may be made of substantially rigid material. This advantageously allows both the labyrinth seal to be made in an even easier manner and increased rigidity to be given to the labyrinth seal itself, thereby making it increasingly effective.

According to one embodiment, the first longitudinal flap comprises a free longitudinal edge and a longitudinal portion extending between the aforesaid fold line and the free longitudinal edge. Said at least one fastening element may comprise complementary fastening elements including a first and a second fastening element. The first fastening element is arranged on the first face of said first flap at said longitudinal portion. The second fastening element is adapted to be coupled with the first fastening element and is arranged on the second face of the second longitudinal flap or on the part of apron from which said second flap extends.

According to one embodiment, the first and second fastening elements are longitudinal fastening elements which extend throughout the entire or substantially the entire length of said first and second flaps. The fact of providing such longitudinal fastening elements advantageously allows the fastening elements themselves to be used to create a barrier for the water which tends to seep through the fastening elements.

According to one embodiment, said first and second fastening elements comprise a first and a second strip of Velcro, respectively. The first and second Velcro strips preferably are fastened to the first and second part of apron, respectively, by means of high frequency welding. Thereby, the waterproofing elements are able to ensure a more effective sealing because the fastening of the Velcro strips by means of high frequency welding prevents the passage of the water between each Velcro strip and the longitudinal flap to which such a strip is fastened, contrarily to the case in which for example, the Velcro strips are sewn to the respective longitudinal flaps.

Alternatively to Velcro strips, said first and second fastening element may comprise a first and a second magnetic strip, respectively.

According to one embodiment, said first and second flaps are connected to the respective part of apron by means of high frequency welding. Thereby, the waterproofing elements are able to ensure a more effective sealing because the connection by means of high frequency welding prevents the passage of the water between each of said flaps and the respective part of apron, contrarily to the case in which for example, said first and second flaps are sewn to the respective parts of apron.

At least one between the first and second flaps preferably is a waterproof flap.

According to one embodiment, said at least one waterproofing element comprises said coupling system. In particular, said coupling system may comprise a waterproof zipper.

According to one embodiment, the legs apron may comprise an anti flap system.

According to one embodiment, the legs apron may comprise an internal heating system.

DESCRIPTION OF THE DRAWINGS

A more complete appreciation of the embodiments of the invention and the related associated advantages will be apparent from the detailed disclosure, to be considered in connection with the accompanying drawings in which.

DETAILED DESCRIPTION

Figure 1:
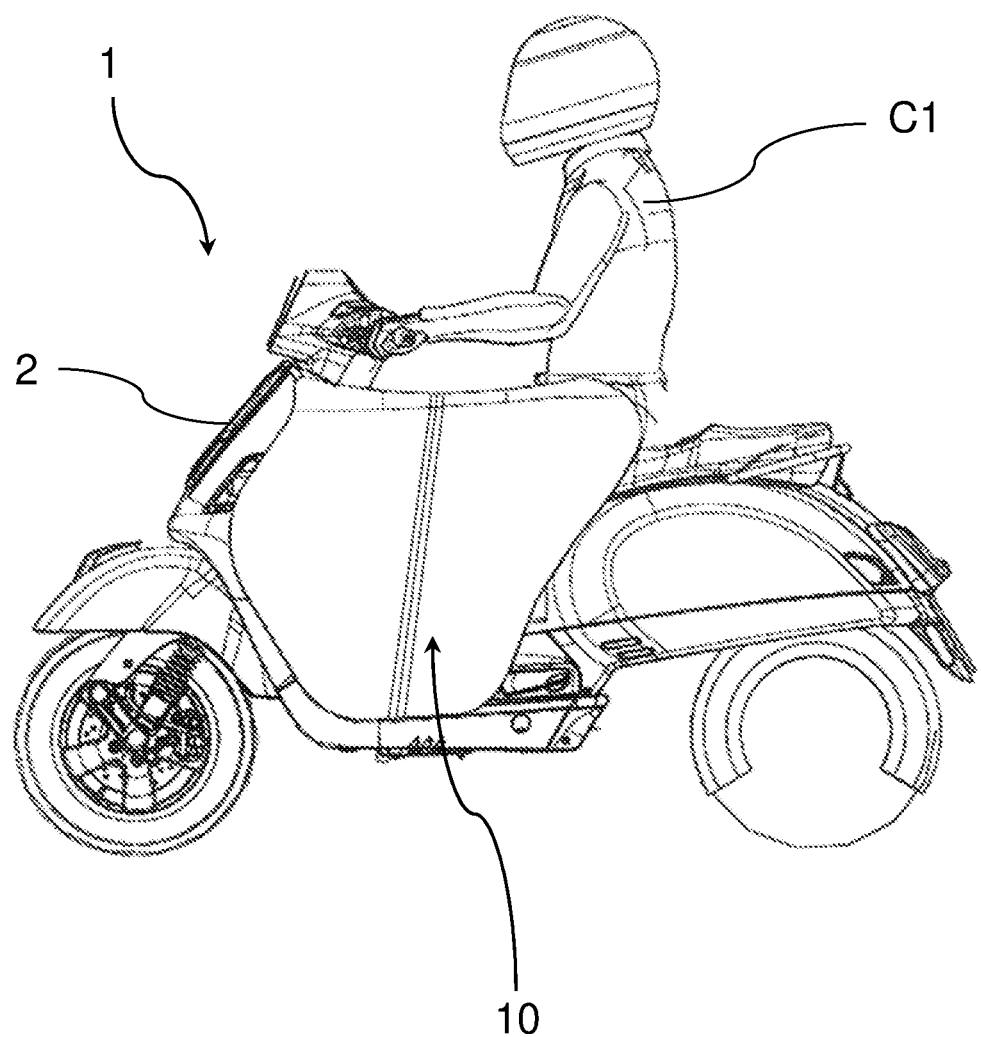
FIG. 1 shows a side view of a motor vehicle with the related driver in which the legs of the driver are covered by a legs apron according to a preferred embodiment of the present invention.

The following description of one or more embodiments of the invention relates to the accompanying drawings. The same numerals in the drawings identify equal or similar elements. The drawings are not necessarily depicted to scale. Moreover, the following detailed description should not be considered limiting to the invention itself. The object of the invention is defined by the appended claims. The technical details, structures or features of the solutions hereinafter described may be combined with one another in any manner.

With reference initially to FIG. 1, a legs apron according to a currently preferred embodiment is generally indicated with numeral 10. The legs apron 10 in particular is a divisible type of apron. The legs apron 10 in FIG. 1 is fastened to a motor vehicle 1, in particular a motor scooter 1. It is worth noting in any case that for the purposes of the present description, the term motor vehicle generally is meant to comprise all two- or three- or four-wheel motor vehicles adapted to being used with a legs apron, such as for example and not exhaustively, mopeds, motor scooters, ATVs, etc. In a manner in itself known, the legs apron 10 serves the main function of protecting the legs of a driver C1 of the motor vehicle 1 from bad weather and from the cold. For such a reason, at least the outer side of apron 10 (shown in FIG. 2), i.e. the face of the apron intended to face, in use, the opposite side with respect to the legs of driver C1, preferably is made of a waterproof fabric. Such a waterproof fabric preferably is a synthetic fiber fabric and more preferably, it is a synthetic fiber such as for example polyester or polypropylene or similar materials.

Figure 2:
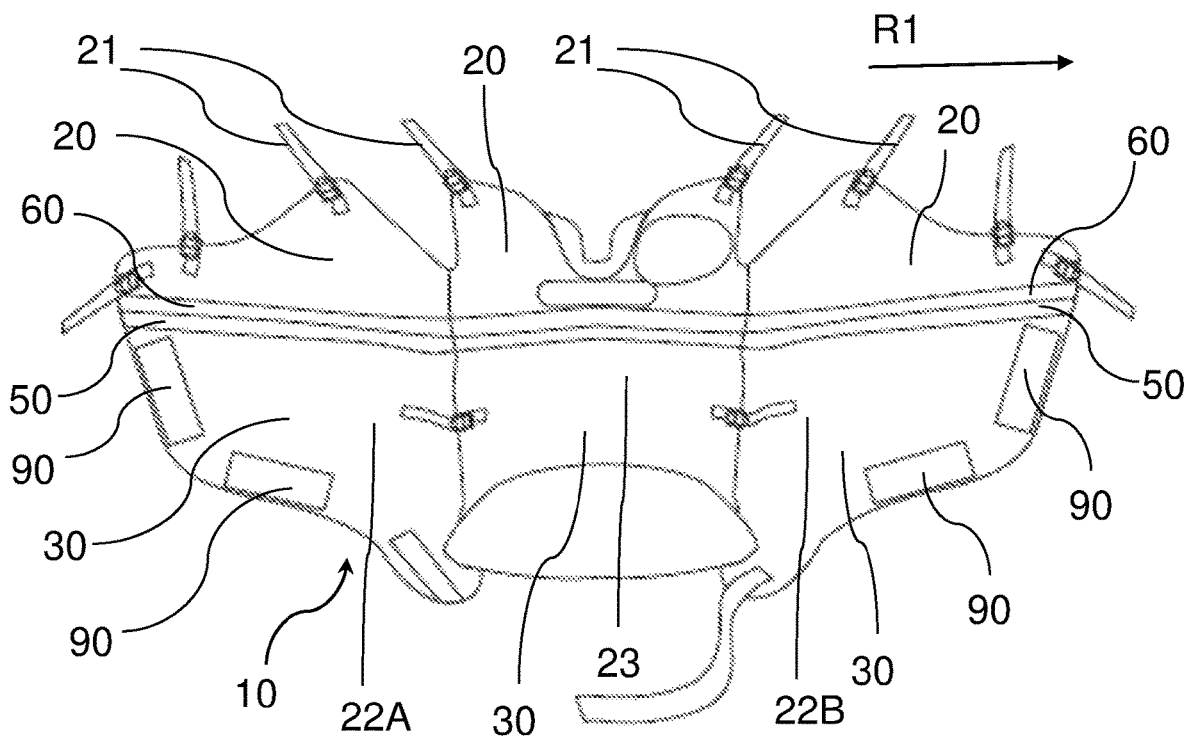
FIG. 2 shows a plan view of the legs apron in FIG. 1.
Figure 3:
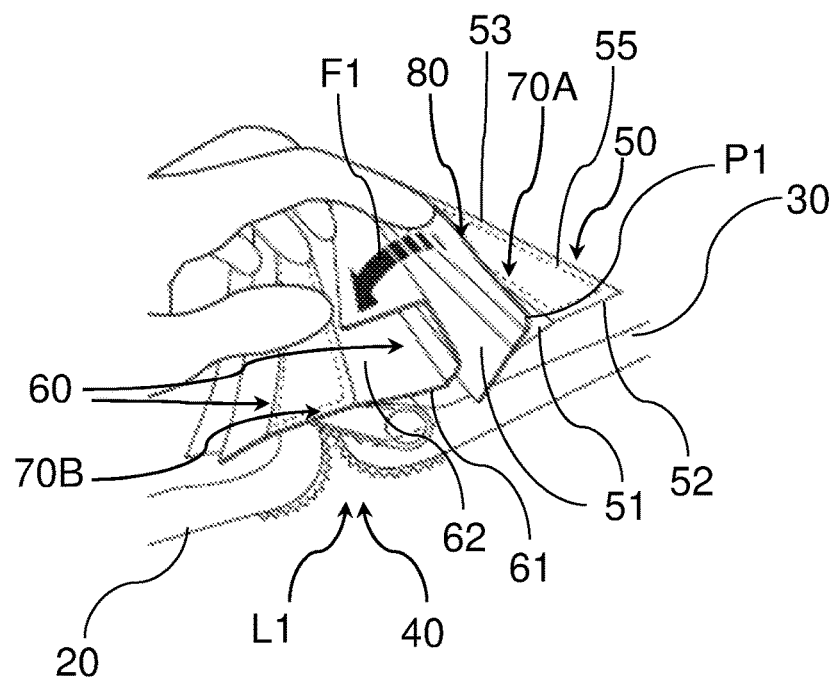
FIGS. 3 to 6 show partial axonometric views related to certain folding and fastening steps of longitudinal flaps of the legs apron in FIG. 1 to make a junction line of the legs apron waterproof.

With reference to FIG. 2, the legs apron 10 comprises a first part 20 of apron comprising anchoring elements 21 for removably anchoring the first part 20 of apron to the motor vehicle 1. The anchoring elements 21 preferably are configured so as to allow the first part 20 of apron at least to be anchored to the so-called shield 2 of the motor vehicle 1. The anchoring elements 21 preferably comprise a plurality of anchoring straps 21, which are in themselves known. Moreover, apron 10 comprises a second part 30 of apron configured to at least cover the legs of driver C1 of the motor vehicle 1. With reference to FIG. 3, apron 10 also comprises a coupling system 40 operatively interposed between the first and the second part 20, 30 of apron to removably couple together the first and second part 20, 30 of apron. In a known manner, when the first and the second part 20, 30 of apron are coupled together, apron 10 comprises a pair of side wings 22A, 22B which are opposed to each other with respect to a middle portion 23 of apron 10. In particular, the middle portion 23 is intended, in use, to be arranged overlapping the top of the legs of driver C1 while the side wings 22A, 22B are intended to be arranged so as to laterally protect the legs of driver C1. The coupling system 40 preferably comprises at least one hinge 40 which preferably extends along a main longitudinal extension direction R1 of apron 10 for the whole or substantially the whole length of apron 10. In particular, hinge 40 extends along the side wings 22A, 22B and along the middle portion 23. The coupling system 40 defines a junction line L1 between the first and the second part 20, 30 of apron when the first and second part 20, 30 of apron are coupled together. According to one embodiment, the junction line L1 corresponds to a median line of hinge 40, i.e. to the line along which the teeth of hinge 40 are coupled.

Apron 10 comprises at least one waterproofing element 40, 50, 60, 80 arranged to waterproof the junction line L1. The at least one waterproofing element 40, 50, 60, 80 comprises a first longitudinal flap 50 which extends from the first part 20 of apron and which is adapted to overlap the junction line L1. In the example shown in the accompanying drawings in particular, the first flap 50 belongs to the second part 30 of apron. The legs apron 10 further comprises at least one fastening element 70A, 70B arranged to stably and removably fasten, when the first flap 50 overlaps the junction line L1, the first flap 50 to the first part 20 of apron, i.e. to the part of apron 10 from which the first flap 50 does not extend. According to one embodiment, the at least one waterproofing element 40, 50, 60, 80 comprises a second longitudinal flap 60 which extends from the first part 20 of apron. In particular, the second flap 60 belongs to the first part 20 of apron. The second flap 60 is configured so as to overlap the junction line L1 and at least partly the first longitudinal flap 50. It is worth noting that according to an alternative embodiment, the first flap 50 and the second flap 60 may be inverted or arranged on a same side of the apron. In other words, the first flap 50 could extend from the first part 20 of apron rather than from the second part 30 of apron, and the second flap 60 could extend from the second part 30 of apron rather than from the first part 20 of apron. According to one embodiment, the first and second flaps 50, 60 are connected to the respective part of apron 20, 30 by means of high frequency welding.

The first and second flaps 50, 60 are shaped to couple to each other and to be folded along a substantially longitudinal fold line P1, i.e. parallel to the junction line L1, so as to achieve a labyrinth seal coupling. The coupling between the first and second flap and the successive fold is achieved up to obtaining a flat arrangement of the first longitudinal flap (50) and of the second longitudinal flap (60) coupled to each other.

The first and second flaps 50, 60 each comprise a first face 51, 61 adapted to face the junction line L1 and an opposite second face 52, 62. According to one embodiment, the second flap 60 is configured so as to overlap the first longitudinal flap 50 so that at least a portion of the first face 61 of the second longitudinal flap 60 may overlap at least a portion of the first face 51 of the first longitudinal flap 50. According to one embodiment, at least one between the first 50 and the second flap 60 is a waterproof or impermeable flap. In the example shown in the accompanying drawings, both the first flap 50 and the second flap 60 are waterproof flaps.

Figure 5:
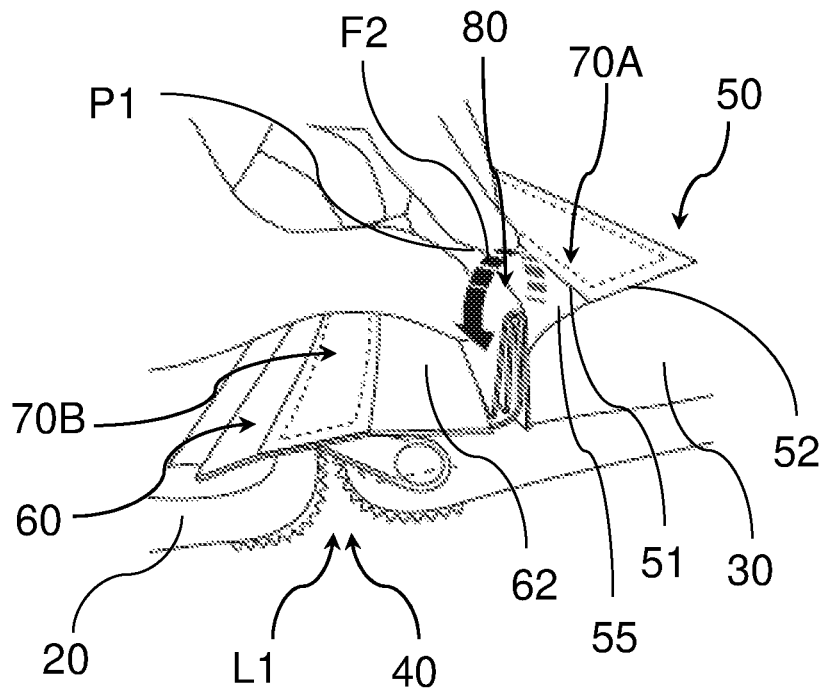

According to one embodiment, the first and the second flaps 50, 60 may be folded together so as to achieve a labyrinth seal (FIG. 5 shows the step of forming the labyrinth seal) once the second longitudinal flap 60 overlaps the first longitudinal flap 50.

According to one embodiment, the at least one waterproofing element 40, 50, 60, 80 comprises a longitudinal extension 80 which protrudes from the first face 51 of the first longitudinal flap 50 and which is joined to the first face 51 of the first longitudinal flap 50 so as to define a fold line P1. In particular, the second flap 60 is adapted to at least partly overlap the longitudinal extension 80 so as to be folded together with the longitudinal extension 80 about the fold line P1.

According to an advantageous embodiment, the longitudinal extension 80 comprises at least one stiffening element. Such a stiffening element may be, by way of non-limiting example, both a rigid element with respect to the fabric of the longitudinal extension 80 which is fastened to the longitudinal extension 80, for example a stiffening element made by means of a rigid longitudinal band fastened to the longitudinal extension 80, and a stiffening element integrated in the longitudinal extension 80, which may be made for example by means of a thickening of the longitudinal extension 80.

According to one embodiment, the first longitudinal flap 50 comprises a free longitudinal edge 53 and a longitudinal portion 55 extending between the fold line P1 and the free longitudinal edge 53. Moreover, the at least one fastening element 70A, 70B comprises complementary fastening elements 70A, 70B. Such complementary fastening elements are depicted in FIGS. 3 to 6 by means of dotted lines. The complementary fastening elements 70A, 70B preferably include a first and second fastening element 70A, 70B. In particular, the first fastening element 70A is arranged on the first face 51 of the first flap 50 at the longitudinal portion 55. The second fastening element 70B is adapted to be coupled with the first fastening element 70A and is arranged on the second face 62 of the second longitudinal flap 60 (as shown in FIGS. 3 to 6) or in general on the part of apron from which said second flap 60 extends. According to one embodiment, the first and second fastening elements 70A, 70B are longitudinal fastening elements which extend throughout the entire or substantially the entire length of said first and second flaps 50, 60. With reference to FIGS. 3 to 6, the first and second fastening elements 70A, 70B comprise a first and a second strip of Velcro 70A, 70B, respectively. According to an advantageous embodiment, the first Velcro strip 70A is fastened to the first flap 50 and the second Velcro strip is fastened to the second flap 60 or to the first part 20 of apron by means of high frequency welding. According to an alternative embodiment, instead of Velcro strips, the first and second fastening elements 70A, 70B may comprise a first and a second magnetic strip, respectively.

According to one embodiment, the at least one waterproofing element 40, 50, 60, 80 may comprise a waterproofing element integrated in the coupling system 40 in addition or alternatively to the first and second flap 50, 60. In such a case, the coupling system 40 may comprise for example, a waterproof zipper 40.

According to one embodiment, apron 10 may comprise an anti flap system 90. The anti flap system 90 preferably comprises a plurality of plate-shaped stiffening portions 90 which overlap and are fastened to the side wings 22A, 22B of apron 10. Although the stiffening portions 90 in the drawing are fastened to the outer side of apron 10, such portions 90 preferably are fastened to the inner side of apron 10. The portions 90 are constructively simpler, efficiency being equal with respect for example to known anti flap systems which use bars or similar anti flap elements made for example of polymeric foam or of polystyrene, and moreover have reduced thickness. Thereby, the portions 90 are not an impediment for the driver, especially when the driver is to put his/her foot on the ground during stops. The portions 90 are obtained as thickening of the apron by means of portions which are for example, glued. In the example disclosed, the anti flap system 90 comprises, by way of non-limiting example, four plate-shaped stiffening portions 90, two of which are fastened to wing 22A and two of which are fastened to wing 22B. The plate-shaped stiffening portions 90 create an increased thickness of apron 10 and therefore a stiffening effect which reduces or eliminates the flapping of the wings 22A, 22B. According to a preferred embodiment, the plate-shaped stiffening portions 90 are made by means of high density neoprene plates.

According to one embodiment, apron 10 comprises a heating system (not shown in the drawings). Such a heating system preferably is an internal heating system, i.e. a heating system arranged on or on the inner side of the apron (in other words, on the face of apron 10 intended to face, in use, the legs of driver C1) or inserted in apron 10 itself. In particular, the heating system may comprise heating systems in themselves known, such as for example a synthetic fur applied on the inner side of apron 10, preferably at at least the middle portion 23 of apron 10, or an electrical resistance inserted in apron 10 and connectable to the electric system of motorcycle 1 for example, by means of a USB port.

Having described the structure of apron 10, now an example method for achieving the sealing of the junction line L1 of apron 10 is described by way of non-limiting example with reference to the embodiment shown in the accompanying drawings.

Figure 4:
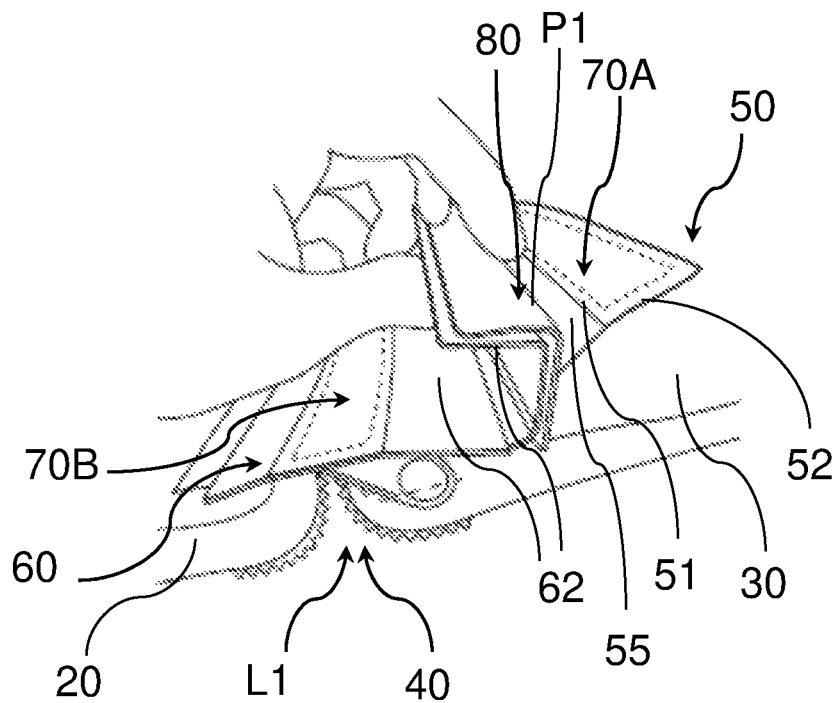
Figure 6:
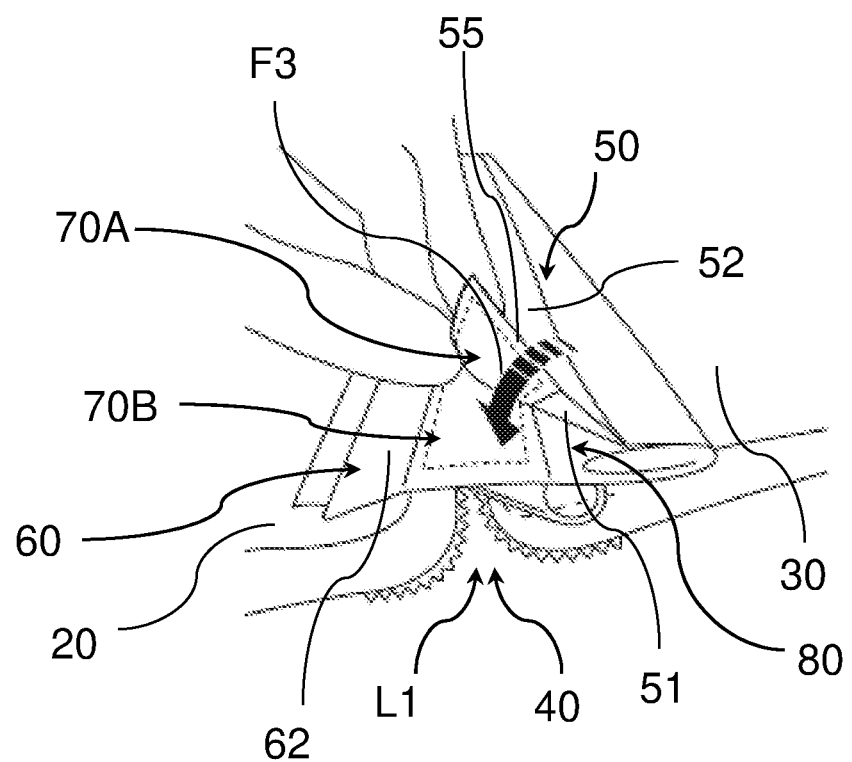

With reference to FIG. 3, once the coupling is carried out between the parts 20 and 30 of apron 10 by means of hinge 40, an initial portion of the second flap 60 is placed to overlap hinge 40, i.e. the junction line L1, and an end portion of the second flap 60 is placed to overlap a part of face 51 of the first flap 50 and the longitudinal extension 80, as indicated by arrow F1. FIG. 4 shows the aforesaid step of overlapping the second flap 60 over the first flap 50 once such an overlapping step is completed. Then, as shown by arrow F2 in FIG. 5, the longitudinal extension 80 and the second flap 60 are folded together about the fold line P1 so as to achieve the labyrinth seal. Finally, with reference to FIG. 6, as indicated by arrow F3, the first flap 50 is moved close to the second flap 60 so that the first fastening element 70A may be coupled to the second fastening element 70B (FIG. 6 depicts the coupling of the elements 70A and 70B when the coupling is almost complete) and so that the labyrinth seal is interposed between the first and second flap 50, 60.

In an advantageous embodiment, the legs apron further comprises an anti flap system which comprises at least one stiffening element coupled to the legs apron.

Additionally, the legs apron comprises an internal heating system adapted to heat the space delimited by the legs apron in which the legs of the user are placed.

In conclusion, while the embodiments of the inventive object herein described are shown in the drawings and described in detail above, it is apparent to the expert in the field that the invention thus conceived is susceptible to several modifications or variants, all falling within the invention; moreover, all the details may be replaced by technically equivalent elements. Practically, the quantities may be varied according to technical needs. Thus, the object of the innovation herein disclosed is to be considered broader in the case at hand than the accompanying claims so as to include all possibilities of modification, replacement or omission. The elements, structures and instruments of the various embodiments may be combined with one another in a different manner.

The invention claimed is:

1. Legs apron for a motor vehicle 1, comprising:
    a first part of apron comprising anchoring elements for removably anchoring the first part of apron to the motor vehicle;
    a second part of apron configured to at least cover the legs of a driver of the motor vehicle;
    a coupling system interposed between the first and the second part of apron for removably coupling the first and second part of apron to each other, said coupling system defining a junction line between the first and second part of apron when the first and second part of apron are coupled together;
    said apron comprising at least one waterproofing element arranged for waterproofing said junction line,
    wherein said waterproofing element comprises:
    a first longitudinal flap which extends from one of the first and second part of apron and which is adapted to overlap the junction line,
    a second longitudinal flap which extends from the other one of the first and second part of apron,
    wherein once the second longitudinal flap is coupled to the first longitudinal flap, said first and second longitudinal flaps are folded along a fold line so as to achieve a labyrinth seal.

2. Legs apron according to claim 1, wherein there is provided at least one fastening element arranged for stably and removably fastening, when said first longitudinal flap overlaps the junction line, said first longitudinal flap to the other part of apron selected from the first and second part of apron from which the first longitudinal flap does not extend.

3. Legs apron according to claim 1, wherein said second longitudinal flap is configured so as to overlap the junction line and at least partly the first longitudinal flap.

4. Legs apron according to claim 1, wherein said first and second longitudinal flaps each comprise a first face suitable for facing the junction line and an opposite second face, said second flap being configured to overlap the first longitudinal flap such that at least a portion of the first face of the second longitudinal flap overlaps at least a portion of the first face of the first longitudinal flap.

5. Legs apron according to claim 1, wherein said at least one waterproofing element comprises a longitudinal extension which protrudes from said first face of the first longitudinal flap and which is joined to the first face of the first longitudinal flap so as to define said fold line, wherein said second longitudinal flap is suitable for overlapping at least in part said longitudinal extension so as to be folded together with the longitudinal extension around the fold line.

6. Legs apron according to claim 5, wherein the longitudinal extension comprises at least one stiffening element.

7. Legs apron according to claim 2, wherein the first longitudinal flap comprises a free longitudinal edge and a longitudinal portion extended between the fold line and the free longitudinal edge, wherein said at least one fastening element comprises complementary fastening elements including a first and a second fastening element, the first fastening element being arranged on the first face of said first longitudinal flap in correspondence of said longitudinal portion, the second fastening element being suitable for coupling with the first fastening element and being arranged on the second face of the second longitudinal flap or on the part of apron from which said second longitudinal flap extends.

8. Legs apron according to claim 7, wherein said first and second fastening elements are longitudinal fastening elements which extend throughout the entire or substantially the entire length of said first and second longitudinal flaps.

9. Legs apron according to claim 8, wherein the first and second fastening elements are respectively fastened to said first longitudinal flap and said second longitudinal flap or second part of apron by means of high frequency welding.

10. Legs apron according to claim 1, wherein said first and second longitudinal flaps are connected to the respective part of apron by means of high frequency welding.

11. Legs apron according to claim 1, wherein at least one between the first and second longitudinal flaps is a waterproof flap.

12. Legs apron according to claim 1, wherein said coupling system comprises a waterproof zipper.

13. Legs apron according to claim 8, wherein said first and second fastening elements are selected from: a first and a second strip of hooks and loops, or a first and a second magnetic strip.

\* \* \* \* \*